Reissued Sept. 5, 1939

Re. 21,195

UNITED STATES PATENT OFFICE 21,195

TREATING SURFACES OF FIBROUS MATERIALS

Charles M. Boyce, deceased, late of High Park, New Brunswick, county of Middlesex, N. J., by John R. Ditmars, assignee, New Brunswick, N. J.

No Drawing. Original No. 1,978,406, dated October 30, 1934, Serial No. 545,833, June 20, 1931. Application for reissue November 20, 1937, Serial No. 175,694

6 Claims. (Cl. 91—68)

The present invention relates to improvements in compositions for treating the surfaces of fibrous stocks, such as paper, pulp board, insulating board, wood and the like, and to the resulting products. It will be fully understood from the following description, in which specific examples embodying the composition are set forth for the purpose of illustrating the same.

The compositions prepared in accordance with the present invention have certain marked advantages in use. They may be employed to produce a transparent, moisture-repellant and grease-proof coating. In applying the film, a highly adherent and flexible coating is secured, even on absorptive stocks, or the composition may be applied to unsized stocks to secure a moisture-repellant and grease-proofing action. The film resists abrasion and does not break or fracture easily on sharp bending or creasing of the coated stock. By varying the thickness of the film produced, for example, by varying the consistency of the solution, surfaces ranging from matte or semi-matte to gloss may be secured uniformly over the surface of the stock treated, which stock may, if desired, be ink-imprinted. When applied to an ink-imprinted stock, the coating greatly enhances the depth of tone, definition and brilliance of the ink-imprint. Thus, the composition may be employed for the treatment of labels and containers for food stuffs, tobacco products and the like where retention or exclusion of moisture, grease or the like may be desirable.

In preparing a composition in accordance with the present invention, an aqueous solution of gelatin, preferably containing a small amount of a suitable hardening agent, such as formaldehyde, hexamethylenetetramine, an alum or the like is employed. A small amount of a flexibility-imparting agent, such as a sulfonated oil, glycerine or the like may be incorporated, if desired, but is not necessary. Varying proportions of a non-resinous phthalic acid ester of a polyhydric alcohol, such as glycerine or glycol are also incorporated in the solution. The term "non-resinous" as used throughout this specification and claims is intended to mean "not hard nor solid like rosin, but that it is a partly condensed soluble form of the substance described". The phthalate ester is secured by heating the alcohol with an approximately equivalent proportion of phthalate anhydride, the esterification being carried to the production of a viscous sirupy liquid, soluble in water. For example, a suitable product may be secured by heating glycerine with a monomolecular equivalent of phthalic anhydride at about 280° F. for three hours. The non-resinous, syrupy ester thus secured is incorporated in the gelatin solution, suitably after neutralization with a suitable alkali, for example, ammonia. Alcohol may be incorporated in the solution to improve the flow characteristics and evenness of the surface produced, and to increase the speed of evaporation of the vehicle. Acetone may also be incorporated in the solution with varying quantities of alcohol.

Thus, in preparing a composition for use in accordance with the present invention, as the vehicle water or a mixture of water and ethyl or methyl alcohol may be employed, the proportion of the latter ranging from 5 to 20% and preferably from 10 to 15%. Similar proportions, or even slightly more of acetone may be included. In the vehicle varying proportions of gelatin may be incorporated, depending upon the consistency desired in the final composition; thus there may be employed from 3 to 10 ounces of gelatin and preferably from 5 to 7.5 ounces to each 100 ounces of the vehicle. A small proportion of a suitable hardener such as formaldehyde, hexamethylenetetramine or the like is incorporated, the proportion varying generally in accordance with the proportion and character of gelatin used, and ranging usually from 1 to 2 ounces per 100 ounces of the vehicle. The proportion of hardening agent employed is preferably such that the film produced is sufficiently hard or non-tacky in character. With such proportion of the hardener, the solution of gelatin would, of itself, congeal in a short time, within a normal working period, but the congelation or the hardening is retarded by the glycerine-phthalate ester, and also by the flexibility imparting agent employed. If desired, a small proportion of a flexibility-imparting agent, such as glycerine, sulfonated oil, or the like, is incorporated, the proportion thereof ranging to as high as 4.5 to 5 ounces per 100 ounces of vehicle. Since the glycerine-phthalate ester imparts flexibility, the separate flexibility imparting agent may be omitted. The proportion of the non-resinous phthalate ester of a polyhydric alcohol, such as glycerine, employed may vary from 2.5 to 7 ounces or more per 100 ounces of vehicle.

Thus, in one specific composition which was prepared in accordance with the present invention, there should be employed, to each 100 ounces of vehicle containing about 14% alcohol, the following:

| | Ounces |
|---|---|
| Gelatin | 5.4 |
| Sulfonated oil | 2.7 |
| 37% formaldehyde solution | 1.4 |
| Glycerine phthalate ester | 4.5 |

In another specific formula which was found suitable for use, there should be employed, to each 100 ounces of a vehicle containing 10% alcohol, the following:

| | Ounces |
|---|---|
| Gelatin | 7.2 |
| Glycerine | 3.6 |
| 37% formaldehyde solution | 1.8 |
| Glycerine phthalate ester | 3.6 |

In a third specific example embodying the invention there should be employed, to each 100 ounces of vehicle:

| | Ounces |
|---|---|
| Gelatin | 5.8 |
| 37% formaldehyde solution | 1.4 |
| Glycerine phthalate ester | 5.8 |

The two latter formulas, however, do not have the full effectiveness of the first in producing moisture-resistant and grease-proof coatings.

In preparing the composition, when alcohol is employed in the vehicle, it is kept separate from the remaining constituents of the mixture until a late stage in the formation thereof. The gelatin is dissolved in a portion of the water, and, if desired, may be mildly acidulated, for example, with acetic acid. The flexibility-imparting agent, if any is used, is added to the aqueous solution of gelatin, suitably after admixture with or solution in a small amount of water, although this is not necessary. The formaldehyde solution is diluted with water. The diluted formaldehyde solution is then added, or, in its place, suitable proportions of a solution of hexamethylenetetramine, or alum or the like may be employed. The alcohol is diluted, suitably with an equal amount of water, and then added to the mixture. The glycerine phthalate ester or other ester employed is then dissolved in part or all of the remaining quantity of water, neutralized, for example, with ammonium hydroxide, and incorporated in the mixture.

The composition of the present invention, on application, produces a film having remarkable moisture resistant and grease-proofing qualities. When applied to fibrous stocks, it produces a film having a natural luster and does not tend to cockle or curl the stock, even when the latter is a thin paper. The film is highly adherent, and even when used with highly absorptive stocks, such as newsprint, carton board or the like, it is not "robbed" of its glycerine or other important constituents by the stock with resulting brittleness or fragility of the film. It may be employed in imparting a uniform surface to ink-imprinted bases, such as cartons, labels, and the like, and when so employed, greatly accentuates and enhances the depth of tone, detail and brilliance of the ink-imprints thereon. Thus the composition may be employed for the treatment of the paper wrappers or the cartons for food products, tobacco products, and the like, which it is desired to keep under approximately constant humidity conditions, or when it is important to avoid transmission of oils, greases or fats through the container or wrapper, or preserve against access of moisture. The stock is treated on the side to which the oil, grease or fat has access. The composition may be applied to the outside of the container or wrapper after suitable designs or legends have been printed thereon in ink and in such cases it not only prevents transmission of moisture, but also greatly improves the surface characteristics of the container or wrapper and the ink-imprints thereon and provides a uniform surface appearance.

The composition may be suitably applied to ink-imprinted stocks on leaving the printing press in any suitable manner, for example, by rollers, surface contact with the coating solution, by immersion or the like, and prevents offsetting of the inks. By modifying the consistency of the solution in connection with the stock treated, varying surfaces from matte or semi-matte to lustrous may be secured uniformly over the entire surface of the ink-imprinted base.

The surface of the treated base, after application of the coating composition and drying thereof, may be further improved and a high gloss or enamel finish imparted thereto by superficially moistening the surface film, for example, by application thereto of water, water and alcohol, water and acetone, or acetone and alcohol with a small amount of water, which may be slightly acidulated, as with acetic acid, if desired, forcing the conditioned film into intimate contact with a highly polished surface of metal, glass or the like, and drying it thereon.

In the treatment of paper or other stocks for use as containers for food products and the like, it is preferred that a coating be applied to the side of the sheet to be turned towards the food product, thereby rendering the interior of the container grease-proof and preventing discoloration. In the use of printed containers or cartons, it is particularly advantageous that the base of the stock forming the carton or package be so treated, and the ink-imprinted face may also be treated with the composition of the present invention, as hereinbefore set forth.

The application of the composition and the subsequent treatment of the resulting treated base may be carried out, for example, as described in prior patents of Charles M. Boyce, Nos. 1,719,796 granted July 2, 1929, and 1,725,699 granted August 20, 1929, or by any other suitable printing, coating or treating apparatus.

What is claimed is:

1. A coating composition adapted to be applied to the surface of material and form a transparent film thereon which coating composition comprises a mixture containing gelatin and the reaction product formed by heating for a period not exceeding three hours glycerine and a substantially molecular equivalent quantity of phthalic anhydride at a temperature of substantially 280° F.

2. A coating composition adapted to be applied to the surface of material and form a transparent film thereon which coating composition comprises a mixture containing gelatin, formaldehyde and the reaction product formed by heating for a period not exceeding three hours glycerine, a substantially molecular equivalent quantity of phthalic anhydride at a temperature of substantially 280° F.

3. A coating composition adapted to be applied to the surface of material and form a transparent film thereon which coating composition comprises a mixture containing gelatin, formaldehyde, sulphonated oil and the reaction product formed by heating for a period not exceeding three hours glycerine and a substantially molecular equivalent quantity of phthalic anhydride at a temperature of substantially 280° F.

4. A sheet material having on the surface thereof a coating as defined in claim 1.

5. A sheet material having on one surface thereof a coating as defined in claim 2.

6. A sheet material having on one surface thereof a coating as defined in claim 3.

JOHN R. DITMARS,
*Assignee of Charles M. Boyce, Deceased.*